United States Patent
Watanabe et al.

(10) Patent No.: US 7,100,572 B2
(45) Date of Patent: Sep. 5, 2006

(54) FUEL INJECTION SYSTEM AND FUEL INJECTING METHOD FOR INTERNAL COMBUSTION ENGINE

(75) Inventors: Tsuguo Watanabe, Saitama (JP); Tomomi Yuhara, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 419 days.

(21) Appl. No.: 10/645,519

(22) Filed: Aug. 22, 2003

(65) Prior Publication Data
US 2005/0229907 A1    Oct. 20, 2005

(30) Foreign Application Priority Data
Sep. 10, 2002    (JP) .............................. 2002-264559

(51) Int. Cl.
*F01B 1/00*    (2006.01)
(52) U.S. Cl. ................... 123/429; 123/478; 123/683
(58) Field of Classification Search ............. 123/429, 123/434, 478, 480, 683, 462
See application file for complete search history.

(56) References Cited

U.S. PATENT DOCUMENTS

| | | | |
|---|---|---|---|
| 4,768,486 A | | 9/1988 | Koike et al. |
| 4,825,834 A | | 5/1989 | Toshimitsu et al. |
| 4,945,870 A | * | 8/1990 | Richeson .................. 123/90.11 |
| 6,539,785 B1 | * | 4/2003 | Nagaishi ..................... 73/118.2 |
| 6,672,283 B1 | * | 1/2004 | Kanno .................... 123/406.59 |
| 6,860,246 B1 | * | 3/2005 | Katayama ................. 123/90.17 |

FOREIGN PATENT DOCUMENTS

| | | |
|---|---|---|
| JP | 04-183949 A | 6/1992 |
| JP | 4-183949 A | 6/1992 |
| JP | 63-147953 A | 6/1998 |
| JP | 10-196440 A | 7/1998 |

* cited by examiner

*Primary Examiner*—John T. Kwon
(74) *Attorney, Agent, or Firm*—Birch, Stewart, Kolasch & Birch, LLP

(57) ABSTRACT

A fuel injection system and method for injecting fuel for an internal combustion engine having fuel injection valves arranged on the upstream side and downstream side from the throttle valve respectively which consistently supplies an adequate quantity of fuel into the combustion chamber without fuel adhering to or remaining at the throttle valve, even when the throttle valve is abruptly enclosed. Based on plural parameters including the throttle opening $\theta TH$ and the engine speed NE, the system includes means for determining the injection quantity of each of the upstream and downstream fuel injection valves, means for detecting a rate of change $\Delta\theta TH$ of the throttle opening in the injection-valve closing direction, means for stopping fuel injection of the upstream fuel injection valve when the rate of change $\Delta\theta TH$ is large, and means for reducing the injection quantity from the downstream fuel injection valve when the fuel injection of the upstream injection valve is stopped.

12 Claims, 9 Drawing Sheets

| | Cne00 | Cne01 | | | | | | | | | Cnei | Rupper (i,0) | | | Rupper (i,j) | | | Rupper (i,9) | | | Cne14 | Rupper (14,0) | | | Rupper (14,j) | | | Rupper (14,9) |
|---|---|---|---|---|---|---|---|---|---|---|---|---|---|---|---|---|---|---|---|---|---|---|---|---|---|---|---|---|
| Cth0 | Rupper (0,0) | Rupper (1,0) | | | | | | | | | | | | | | | | | | | | | | | | | | |
| Cth1 | .. | .. | | | | | | | | | | | | | | | | | | | | | | | | | | |
| Cth2 | .. | .. | | | | | | | | | | | | | | | | | | | | | | | | | | |
| .. | .. | .. | | | | | | | | | | | | | | | | | | | | | | | | | | |
| Cthj | Rupper (0,j) | Rupper (1,j) | | | | | | | | | | | | | | | | | | | | | | | | | | |
| .. | .. | .. | | | | | | | | | | | | | | | | | | | | | | | | | | |
| Cth7 | .. | .. | | | | | | | | | | | | | | | | | | | | | | | | | | |
| Cth8 | .. | .. | | | | | | | | | | | | | | | | | | | | | | | | | | |
| Cth9 | Rupper (0,9) | Rupper (1,9) | | | | | | | | | | | | | | | | | | | | | | | | | | |

FIG.3

FUEL INJECTION SYSTEM AND FUEL INJECTING METHOD FOR INTERNAL COMBUSTION ENGINE

CROSS-REFERENCE TO RELATED APPLICATION

The present application claims priority under 35 USC 119 to Japanese Patent Application No. 2002-264559 filed on Sep. 10, 2002, the entire contents thereof is hereby incorporated by reference.

BACKGROUND OF THE INVENTION

1. Field of the Invention

The present invention relates to a fuel injection system and fuel injecting method for an internal combustion engine, and more particularly to a fuel injection system in which injection valves have been provided on the upstream side and on the downstream side respectively with a throttle valve interposed therebetween.

2. Description of Background Art

When the fuel injection valve is provided upstream from the throttle valve, the volumetric efficiency is improved because heat is taken from intake air when injection fuel vaporizes. Therefore, the engine output can be increased as compared with when the fuel injection valve is provided downstream from the throttle valve. On the other hand, when the fuel injection valve is provided on the upstream side, a distance between its fuel injection port and the combustion chamber becomes inevitably longer. As a result, when fuel injection is provided on the upstream side a response lag in fuel transport occurs as compared with when the fuel injection valve has been provided downstream from the throttle valve.

There has been disclosed in, for example, Japanese Patent Laid-Open Nos. 4-183949 and 10-196440, a fuel injection system in which fuel injection valves have been provided upstream from and downstream from the intake pipe respectively with a throttle valve interposed therebetween, in order to improve the engine output and cope with the response lag.

FIG. 10 is a cross-sectional view showing a major portion of a conventional internal combustion engine in which two fuel injection valves have been arranged, and with a throttle valve 52 of an intake pipe 51 interposed, there are arranged a downstream fuel injection valve 50a on the side portion of the downstream side (engine side) and an upstream fuel injection valve 50b on the upstream side (air cleaner side). A lower end portion of the intake pipe 51 is connected to an intake passage 52, and an intake port 53 facing a combustion chamber of this intake passage 52 is opened and closed by an intake valve 54.

An injection quantity from each fuel injection valve is determined on the basis of a plurality of parameters including a throttle opening and an engine speed. In a state in which the throttle opening is small, the injection quantity is restricted. According to the above-described conventional technique, however, an injection port of the upstream fuel injection valve 50b points to the throttle valve, and in the upstream fuel injection valve 50b, a response lag occurs because the distance between its fuel injection port and the combustion chamber becomes far.

Therefore, when the throttle valve 52 is abruptly closed to a totally-enclosed state or is closed with a large rate of change in an injection-valve closing direction although not up to the totally-enclosed state, fuel injected from the upstream fuel injection valve 50b adheres to the throttle valve 52 and remains.

Therefore, when the throttle valve 52 is opened next, at that time, not only fuel injected from each fuel injection valve in response to the throttle opening, but also the fuel which has remained at the throttle valve 52 is fed into the combustion chamber at the same time. Therefore, there was a possibility that the fuel quantity becomes excessive to the intake air quantity.

SUMMARY AND OBJECTS OF THE PRESENT INVENTION

It is an object of the present invention to solve the above-described problems of the conventional technique, and to provide a fuel injection system for an internal combustion engine capable of supplying, in the structure in which fuel injection valves are arranged on the upstream side and on the downstream side from the throttle valve respectively, an adequate quantity of fuel into the combustion chamber all the time without fuel adhering to and remaining at the throttle valve even when the throttle valve is abruptly closed.

In order to achieve the above-described object, the present invention is characterized in that in a fuel injection system for an internal combustion engine having an intake pipe equipped with a throttle valve, an upstream fuel injection valve provided upstream from the throttle valve, and a downstream fuel injection valve provided downstream from the throttle valve, the following means have been employed.

On the basis of a plurality of parameters including the throttle opening $\theta TH$ and the engine speed NE, means for determining each fuel injection quantity of the upstream and downstream fuel injection valves, means for detecting a rate of change of the throttle opening in the injection-valve closing direction, and means for stopping fuel injection of the upstream fuel injection valve when the rate of change is larger than the reference rate of change.

(2) Means for reducing the injection quantity of the downstream fuel injection valve only for a predetermined time period when the injection of the upstream fuel injection valve is stopped.

According to the above-described feature (1), since when the throttle valve is abruptly closed, fuel injection from the upstream injection valve is stopped immediately, and fuel adhering to and remaining at the throttle valve is restricted to a minimum.

According to the above-described feature (2), when fuel injection from the upstream injection valve is stopped in response to abruptly-closed throttle valve, the injection quantity from the downstream fuel injection valve is reduced. As a result, the total supply quantity of fuel can be maintained at an adequate value, even though a small quantity of fuel which may have adhered to and have remained at the throttle valve is supplied into the combustion chamber when the throttle valve is opened again thereafter.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 3 is a view showing one example of an injection rate table;

DETAILED DESCRIPTION OF THE PREFERRED EMBODIMENTS

Figure 1:
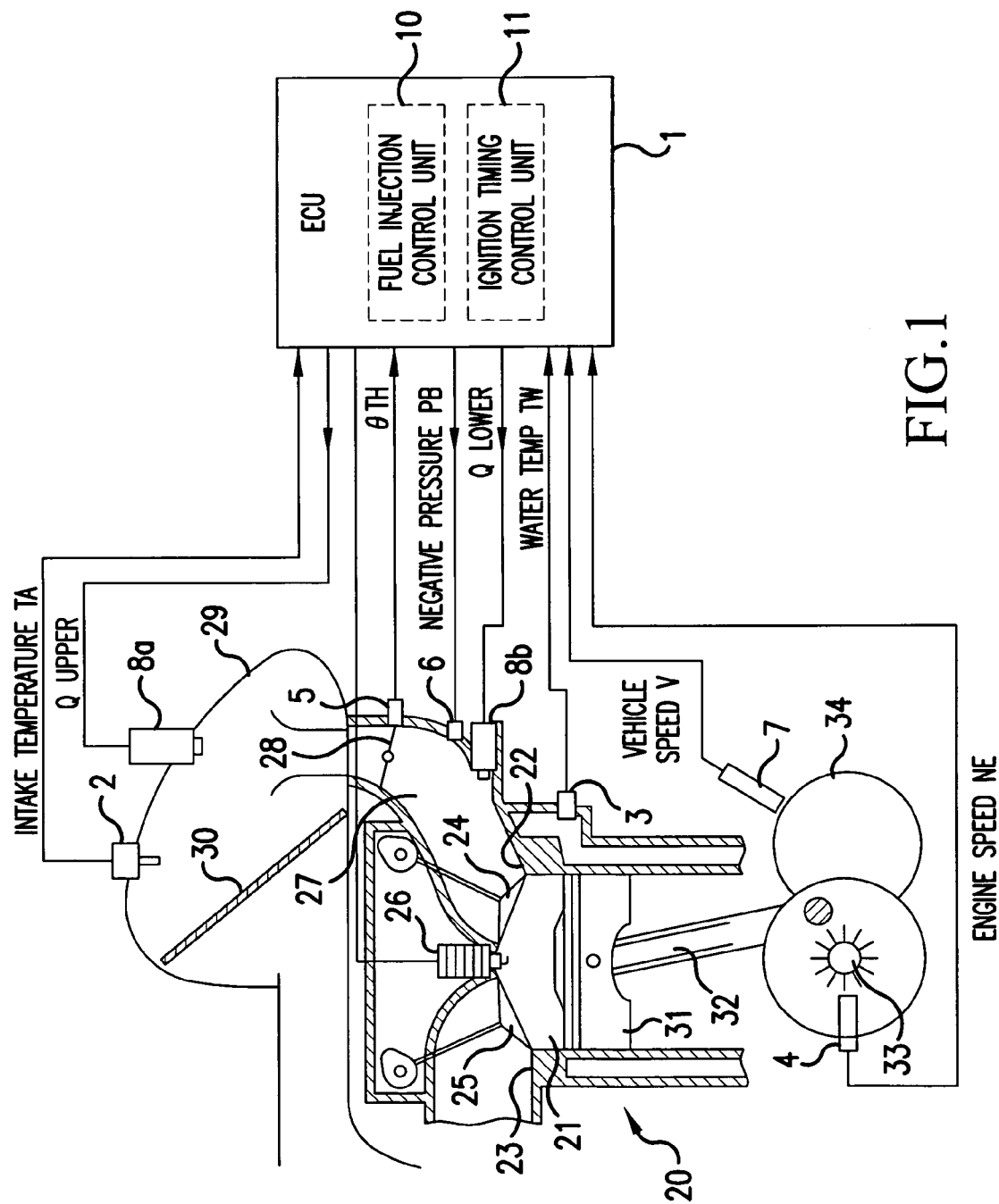
FIG. 1 is a general block diagram showing a fuel injection system according to one embodiment of the present invention.

FIG. 1 is a general block diagram showing a fuel injection system according to one embodiment of the present invention, and on a combustion chamber 21 of the engine 20, there are opened an intake port 22 and an exhaust port 23. Each port 22 and 23 is provided with an intake valve 24 and an exhaust valve 25 respectively, and an ignition plug 26 is provided.

On an intake passage 27 leading to the intake port 22, a throttle valve 28 is provided for adjusting intake air quantity in accordance with its opening θTH, a throttle sensor 5 is provided for detecting the opening θTH, and a vacuum sensor 6 is provided for detecting intake manifold vacuum PB. At a terminal of the intake passage 27 an air cleaner 29 is provided. Within the air cleaner 29, an air filter 30 is provided, and open air is taken into the intake passage 27 through this air filter 30.

In the intake passage 27, a downstream injection valve 8b is provided downstream from the throttle valve 28, and on the air cleaner 29 upstream from the throttle valve 28, an upstream injection valve 8a is arranged so as to point to the intake passage 27. Also, an intake temperature sensor 2 for detecting intake (atmospheric) temperature TA is provided on the air cleaner 29.

Opposite to a crankshaft 33 coupled to a piston 31 of the engine 20 through a connecting rod 32, an engine speed sensor 4 is arranged for detecting engine speed NE on the basis of a rotation angle of a crank. Further, opposite to a rotor 34 such as a gear which is coupled to the crankshaft 33 for rotation, a vehicle speed sensor 7 is arranged for detecting vehicle speed V. On a water jacket formed around the engine 20, a water temperature sensor 3 is provided for detecting cooling water temperature TW representing the engine temperature.

An ECU (Engine Control Unit) 1 includes a fuel injection control unit 10 and an ignition timing control unit 11. The fuel injection control unit 10 outputs, on the basis of signals (process values) obtained by detecting by each of the above-described sensors, injection signals Qupper and Qlower to each injection valve 8a, 8b on the upstream and downstream sides. Each of these injection signals is a pulse signal having pulse width responsive to the injection quantity, and each injection valve 8a, 8b is opened by time corresponding to this pulse width to inject the fuel. The ignition timing control unit 11 controls ignition timing of an ignition plug 26.

Figure 2:
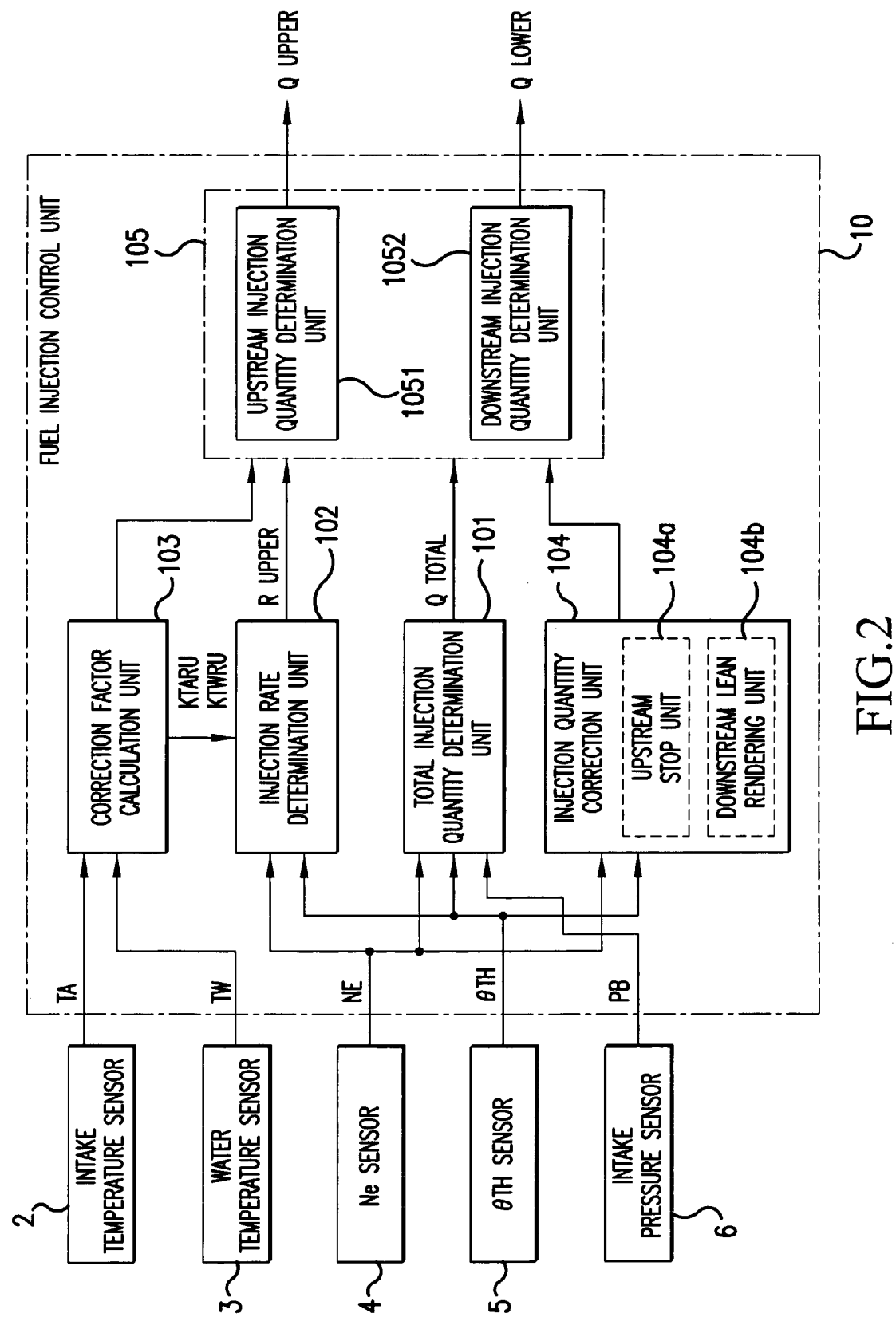
FIG. 2 is a functional block diagram for a fuel injection control unit 10.

FIG. 2 is a functional block diagram for the fuel injection control unit 10, and the same symbols as in the foregoing represent the same or equal portions.

A total injection quantity determination unit 101 determines a total quantity Qtotal of fuel to be injected from each fuel injection valve 8a, 8b on the upstream and downstream sides on the basis of the engine speed NE, the throttle opening θTH and intake pressure PB. An injection rate determination unit 102 refers to an injection rate table on the basis of the engine speed NE and throttle opening θTH to determine an injection rate Rupper of the upstream injection valve 8a. An injection rate Rlower of the downstream injection valve 8b is determined as (1−Rupper).

FIG. 3 is a view showing an example of the injection rate table. In the present embodiment, an injection rate map is constituted with 15 items (Cne00 to Cne14) as a reference as the engine speed NE, and with 10 items (Cth0 to Cth9) as a reference as the throttle opening θTH, and the injection rate Rupper of the upstream injection valve 8a is registered in advance at each combination of each engine speed NE and the throttle opening θTH. The injection rate determination unit 102 determines an injection rate Rupper corresponding to the engine speed NE and the throttle opening θTH that have been detected, by means of the four-point interpolation on the injection rate map.

Reverting to FIG. 2, a correction factor calculation unit 103 refers to a data table on the basis of the intake temperature TA and the cooling water temperature TW that have been detected to seek various correction factors including an intake temperature correction factor KTARU and a cooling water temperature correction factor KTWRU. In the injection quantity determination unit 105, the upstream injection quantity determination unit 1051 seeks a basic injection quantity of the upper injection valve 8a on the basis of the injection rate Rupper and the total injection quantity Qtotal, and multiplies this basic injection quantity by various correction factors including the correction factor KTARU, KTWRU to determine the injection quantity Qupper of the upstream injection valve 8a. A downstream injection quantity determination unit 1052 determines the injection quantity Qlower of the downstream injection valve 8b on the basis of the upstream injection quantity Qupper and the total injection quantity Qtotal.

An injection quantity correction unit 104 corrects the injection quantity of each injection valve 8a, 8b during acceleration, when abruptly closing the throttle opening θTH and at otherwise time. The injection quantity correction unit 104 further includes an upstream stop unit 104a and a downstream lean unit 104b.

The upstream stop unit 104a stops an operation of the upstream injection valve 8a (8a1 to 8a4) of each cylinder in order that fuel may not adhere to the throttle valve in high amounts when abruptly closing the throttle valve 28. In order to prevent an air-fuel mixture from being rendered rich due to a small quantity of fuel adhering to the throttle valve 28 being supplied into the combustion chamber, a downstream lean rendering unit 104b reduces the fuel injection quantity of the downstream injection valve 8b to render the fuel injection quantity leaner its level prior to when the upstream injection was stopped. As regards a control procedure of the upstream stop unit 104a and the downstream lean rendering unit 104b, with reference to a flowchart, the description will be made in detail later.

Next, with reference to a flowchart of FIG. 4, the description will be made of an operation of the fuel injection control unit 10 in detail. This handling is executed by interruption due to a crank pulse in a predetermined stage.

In a step S10, the engine speed NE, the throttle opening θTH, the manifold air pressure PB, the intake temperature TA and the cooling water temperature TW are detected by each of the above-described sensors. In a step S11, in the total injection quantity determination unit 101, total quantity Qtotal of fuel to be injected from each fuel injection valve 8a, 8b on the upstream side and on the downstream side is determined on the basis of the engine speed NE, the throttle opening θTH, and the intake pressure PB.

In a step S12, in the injection rate determination unit 102, an injection rate table is referred to on the basis of the engine speed Ne and the throttle opening θTH, and an injection rate Rupper of the upstream injection valve 8a is determined. In a step S13, the upstream stop unit 104a of the injection quantity correction unit 104 determines whether or not the fuel injection of the upstream injection valve 8a is stopped.

Figure 5:
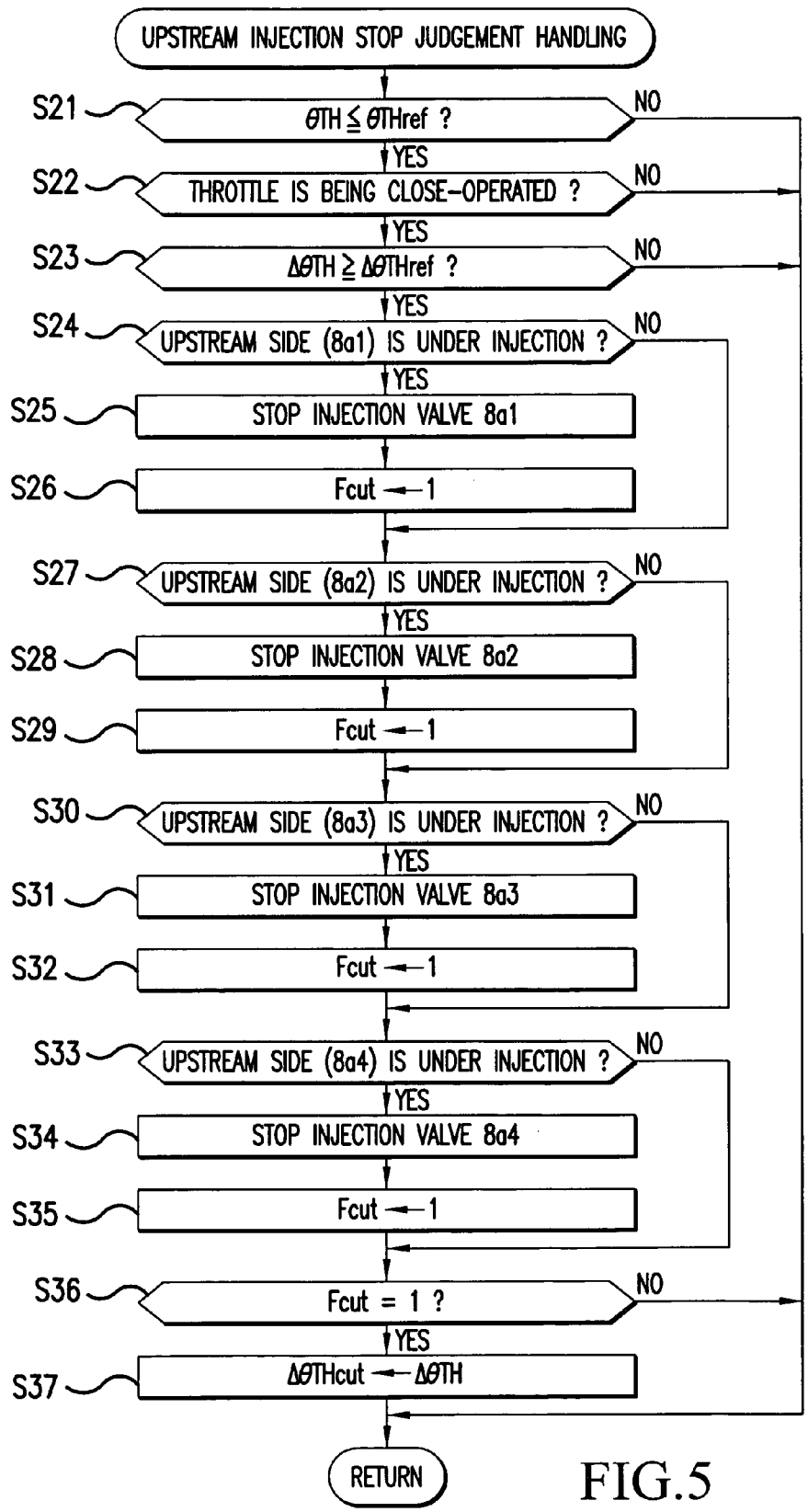
FIG. 5 is a flow chart showing "upstream injection stop judgment handling"

FIG. 5 is a flowchart showing a procedure of "upstream injection stop judgment handling" to be executed in the upstream stop unit 104a, and control in a four-cylinder engine will be exemplified here for description.

In a step S21, the present throttle opening θTH is compared with an upstream injection cut judgment opening θTHref that becomes a judgment criterion as to whether or not the upstream injection will be cut. If θTH. θTHref, in a step S22, it is further judged whether or not the throttle opening has been operated in the direction that closes the throttle.

If under the closing operation, in a step S23, a rate of change ΔθTH of the throttle opening θTH is compared with an upstream injection cut judgment rate of change ΔθTHref that becomes a judgment criterion as to whether or not the upstream injection will be cut. If ΔθTH. ΔθTHref and it is judged that the throttle valve 28 is abruptly enclosed, the sequence will proceed to a step S24 or higher in order to stop the upper injection valve 8b which is being operated.

In a step S24, it is judged whether or not the upstream fuel injection valve 8a1 of a first cylinder is under injection. If under injection, in a step S25, the operation of the fuel injection valve 8a1 is stopped, and in a step S26, an upstream injection cut flag Fcut is set.

Similarly, in a step S27, it is judged whether or not the upstream fuel injection valve 8a2 of a second cylinder is under injection. If under injection, in a step S28, the operation of the fuel injection valve 8a2 is stopped, and in a step S29, the upstream injection cut flag Fcut is set.

Similarly, in a step S30, it is judged whether or not the upstream fuel injection valve 8a3 of a third cylinder is under injection. If under injection, in a step S31, the operation of the fuel injection valve 8a3 is stopped, and in a step S32, the upstream injection cut flag Fcut is set.

Similarly, in a step S33, it is judged whether or not the upstream fuel injection valve 8a4 of a fourth cylinder is under injection. If under injection, in a step S34, the operation of the fuel injection valve 8a4 is stopped, and in a step S35, the upstream injection cut flag Fcut is set.

In a step S36, the upstream injection cut flag Fcut is referred to, and if this has been set, this rate of change ΔθTH of the throttle opening θTH will be set, in a step S37, as a rate of change of the throttle opening θTH when the upstream injection has been stopped, that is, a rate of change ΔθTHcut during injection cut.

Figure 4:
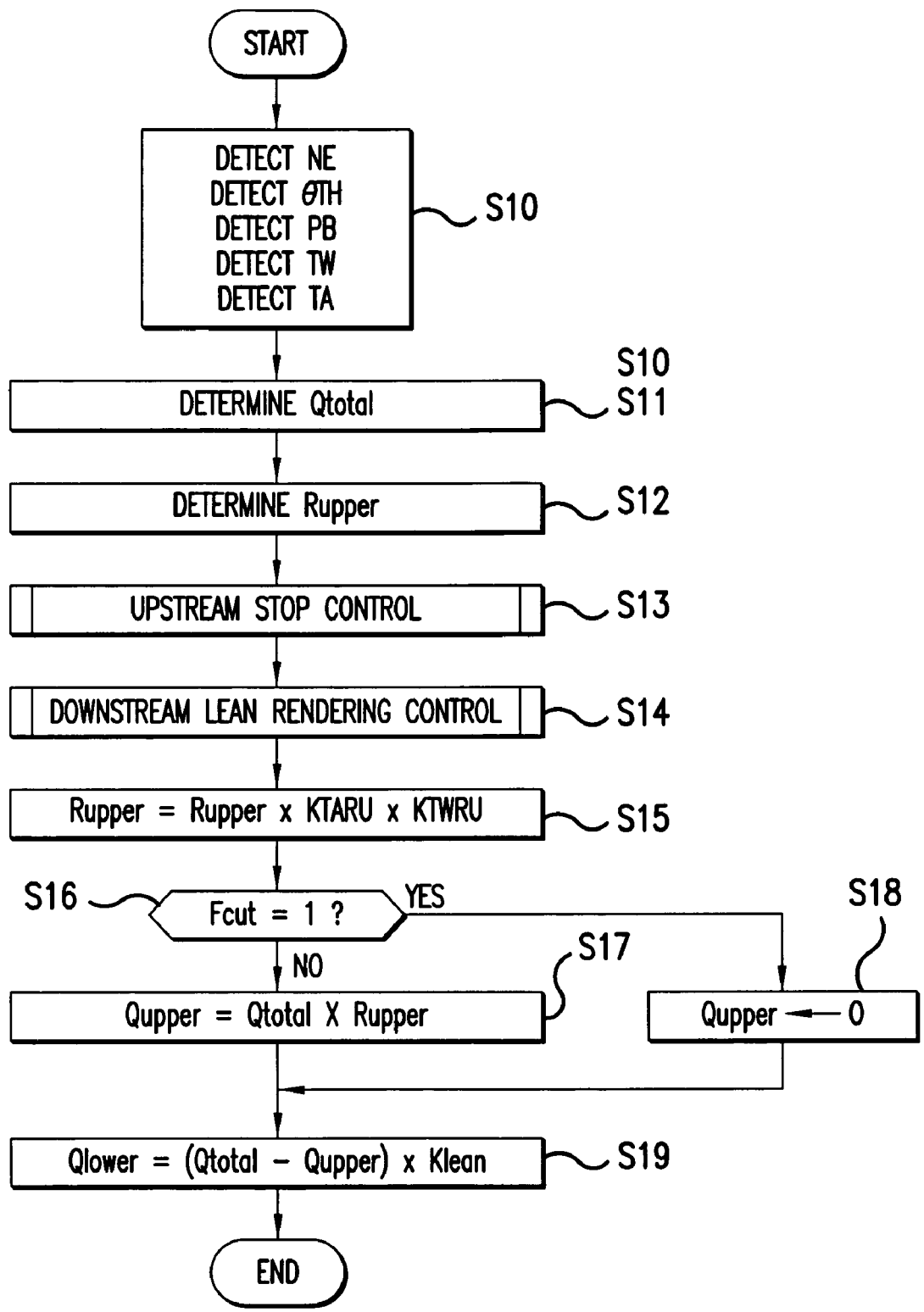
FIG. 4 is a flowchart showing a control procedure of fuel injection.

Reverting to FIG. 4, in a step S14, in the downstream lean rendering unit 104b, when fuel injection from the upstream injection valve has been stopped in response to the throttle valve being abruptly enclosed, "downstream lean rendering control" is executed, thus lowering the downstream injection to a level lower than its level prior to when injection from the upstream valve was stopped.

Figure 6:
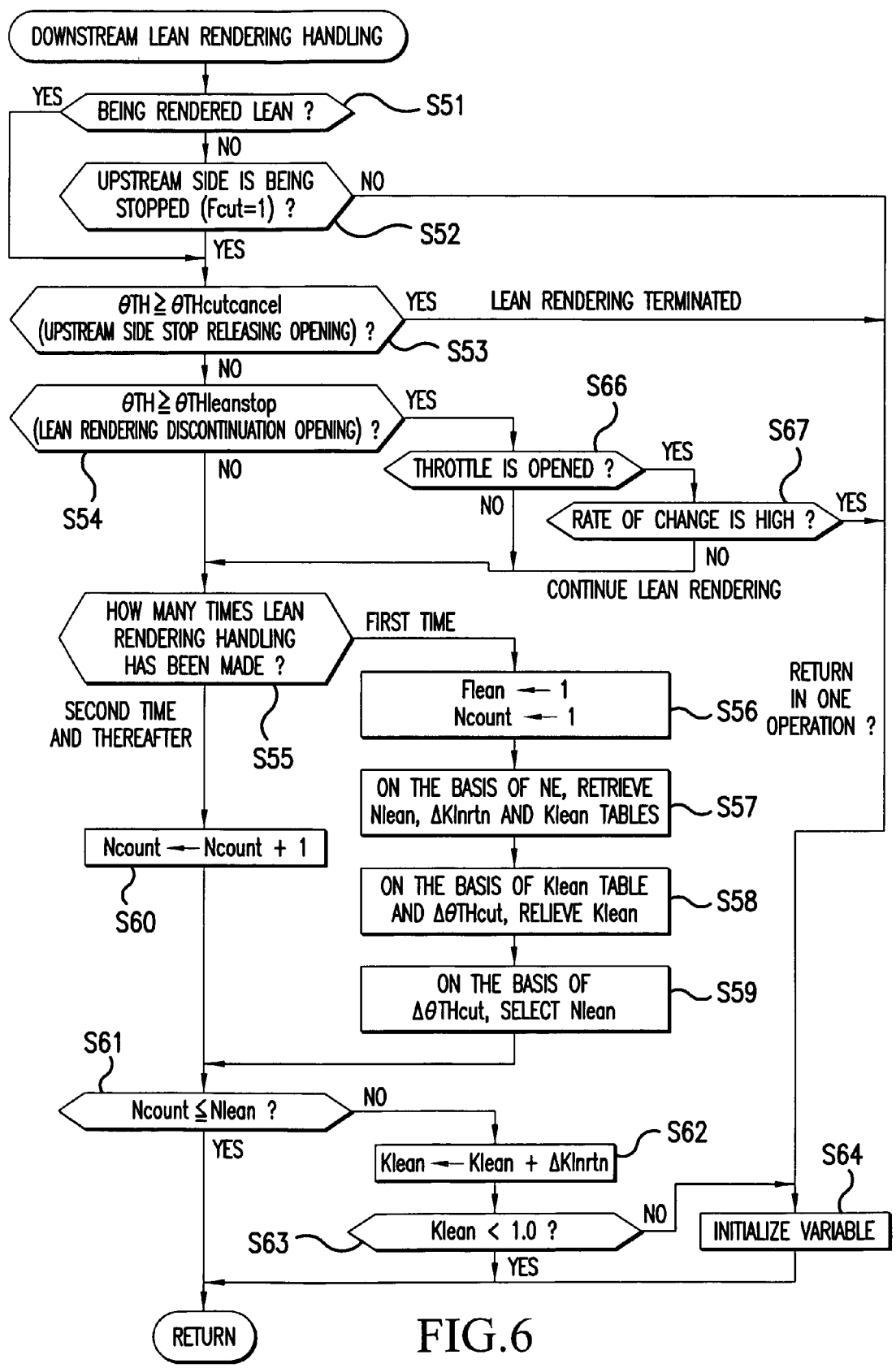
FIG. 6 is a flowchart showing "downstream lean rendering handling"
Figure 7:
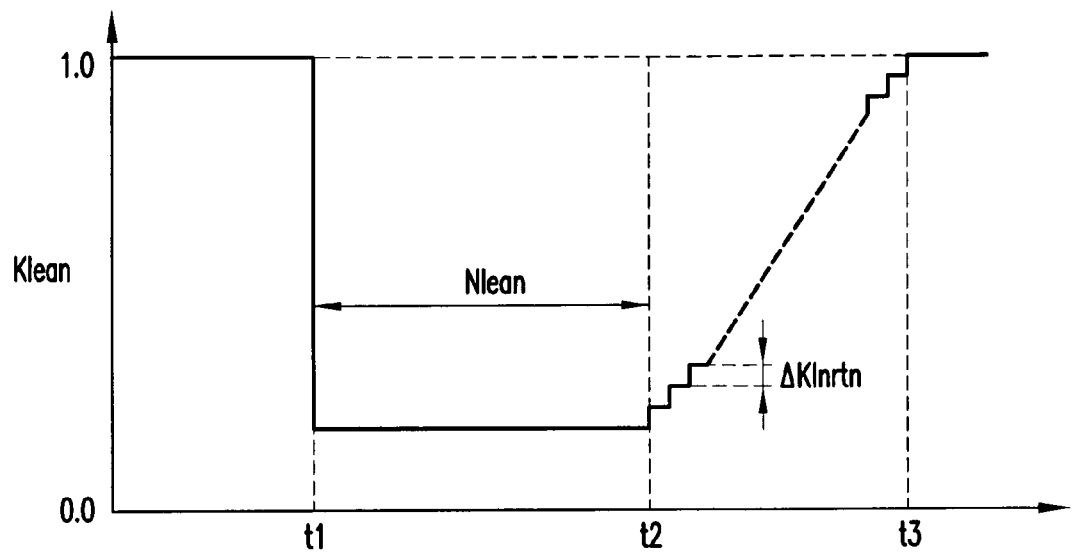
FIG. 7 is a timing chart showing "downstream lean rendering handling"

FIG. 6 is a flowchart showing a procedure of the "downstream lean rendering handling" to be executed in the downstream lean rendering unit 104b, and FIG. 7 is its timing chart.

In a step S51, it is judged on the basis of flag during lean rendering Flean (to be described later) whether or not the lean rendering handling of the downstream injection valve 8b is being continued. Since it is judged that it is not being continued at the beginning, the sequence will proceed to a step S52. In the step S52, it is judged on the basis of the upstream injection cut flag Fcut whether or not the upstream injection is being stopped, and if it is being stopped, the sequence will proceed to a step S53.

In the step S53, the throttle opening θTH is compared with upstream injection stop releasing opening θTHcutcancel, and if θTH. θTHcutcancel, the sequence will proceed to a step S64 in order to stop the downstream lean rendering, and various variables are initialized to terminate the handling concerned. In contrast to this, if θTH<θTHcutcancel, the sequence will proceed to the step S54 in order to continue the lean rendering handling. In the step S54, the throttle opening θTH is compared with a lean rendering stop opening θTHleanstop, and if θTH. θTHleanstop, the sequence will proceed to a step S66. If θTH<θTHleanstop, the sequence will proceed to the step S55 in order to continue the lean rendering handling.

In the step S66, it is judged whether or not the throttle is open-operated, and if not open-operated, the sequence will proceed to the step S55 to continue the lean rendering handling. If open-operated, its rate of change ΔθTH is compared with a reference rate of change in a step S67. If the rate of change ΔθTH exceeds the reference rate of change, the sequence will proceed to a step S64 in order to stop the lean rendering handling. If the rate of change ΔθTH is lower than the reference rate of change, the sequence will proceed to the step S55 in order to continue the lean rendering handling.

In the step S55, it is judged how many times lean rendering handling has been made so far, and since it is judged as the first one at the beginning, the sequence will proceed to a step S56. In the step S56, a flag during lean rendering Flean is set, and "1" is set, as an initial value, to a lean rendering frequency counter Ncount for counting a lean rendering frequency. In a step S57, on the basis of the engine speed NE, there is selected a lean rendering factor table for relieving a lean rendering duration period Nlean for representing time (frequency) for rendering the downstream injection lean, a return opening ΔKlnrtn of the throttle for representing a return speed when returning from the lean rendering and a lean rendering correction factor Klean for reducing the injection quantity by multiplying a fuel injection quantity separately obtained.

Figure 8:
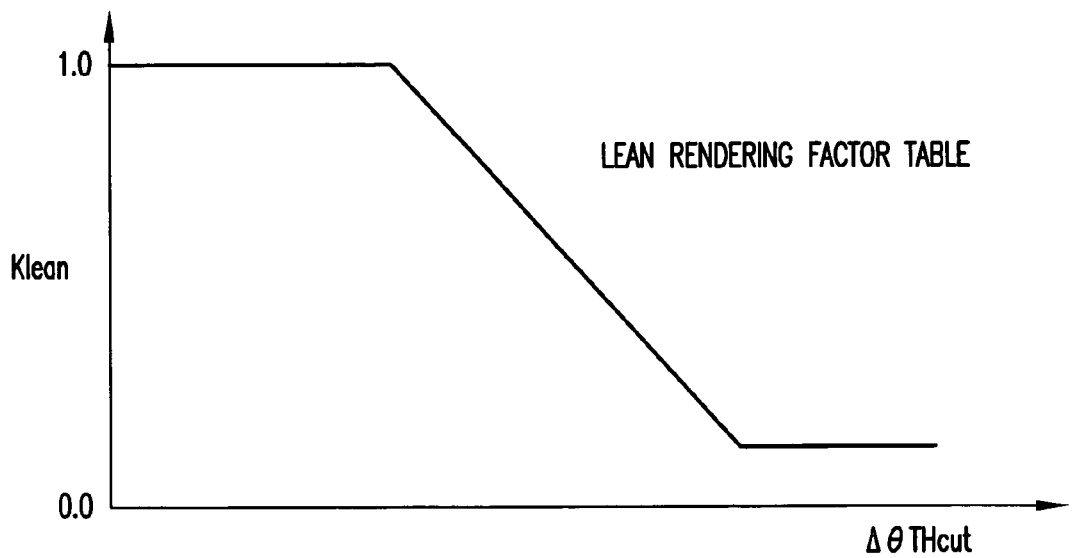
FIG. 8 is a view showing an example of a lean rendering correction factor (Klean) table.

FIG. 8 is a view showing an example of the lean rendering factor table, and the lean rendering correction factor Klean has been registered as a function of a rate of change during the injection cut $\Delta\theta$THcut (step S37 of FIG. 5). A plurality of the lean rendering factor tables have been prepared for each engine speed NE, and a relationship between the lean rendering correction factor Klean and the rate of change during the injection cut $\Delta\theta$THcut differs slightly in response to the engine speed NE.

Reverting to FIG. 6, in a step S58, this lean rendering correction factor Klean will be retrieved and determined at a time t1 of FIG. 7 on the basis of the lean rendering factor table and the rate of change during the injection cut $\Delta\theta$THcut. In a step S59, the lean rendering duration period table will be retrieved on the basis of the rate of change during the injection cut $\Delta\theta$THcut to determine the lean rendering duration period Nlean responsive to the rate of change during the injection cut $\Delta\theta$THcut.

Figure 9:
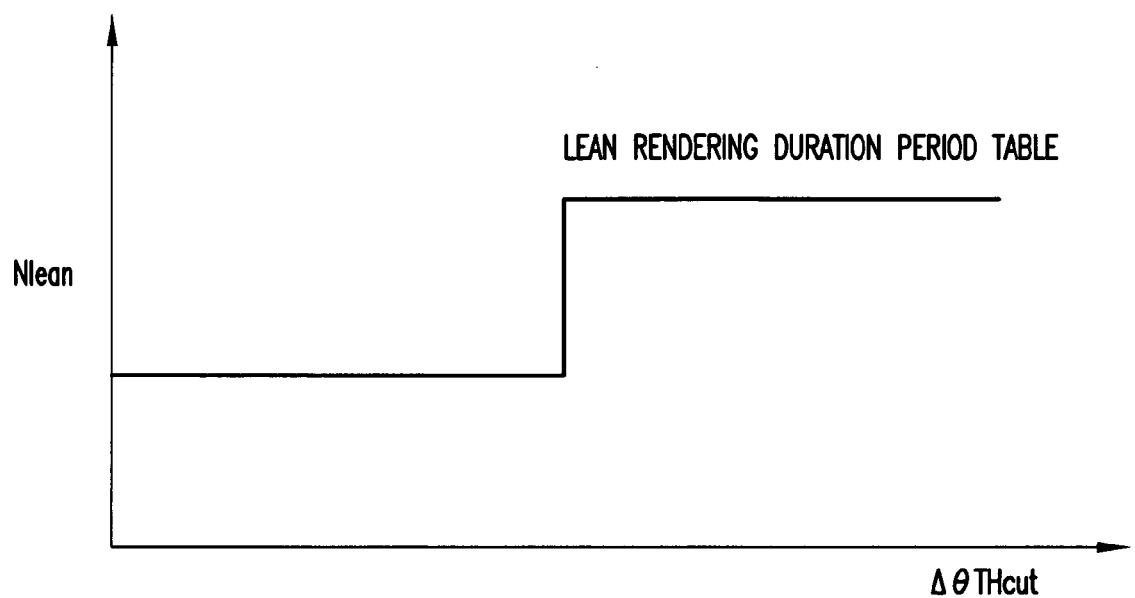
FIG. 9 is a view showing an example of a lean rendering duration period (Nlean)
Figure 10:
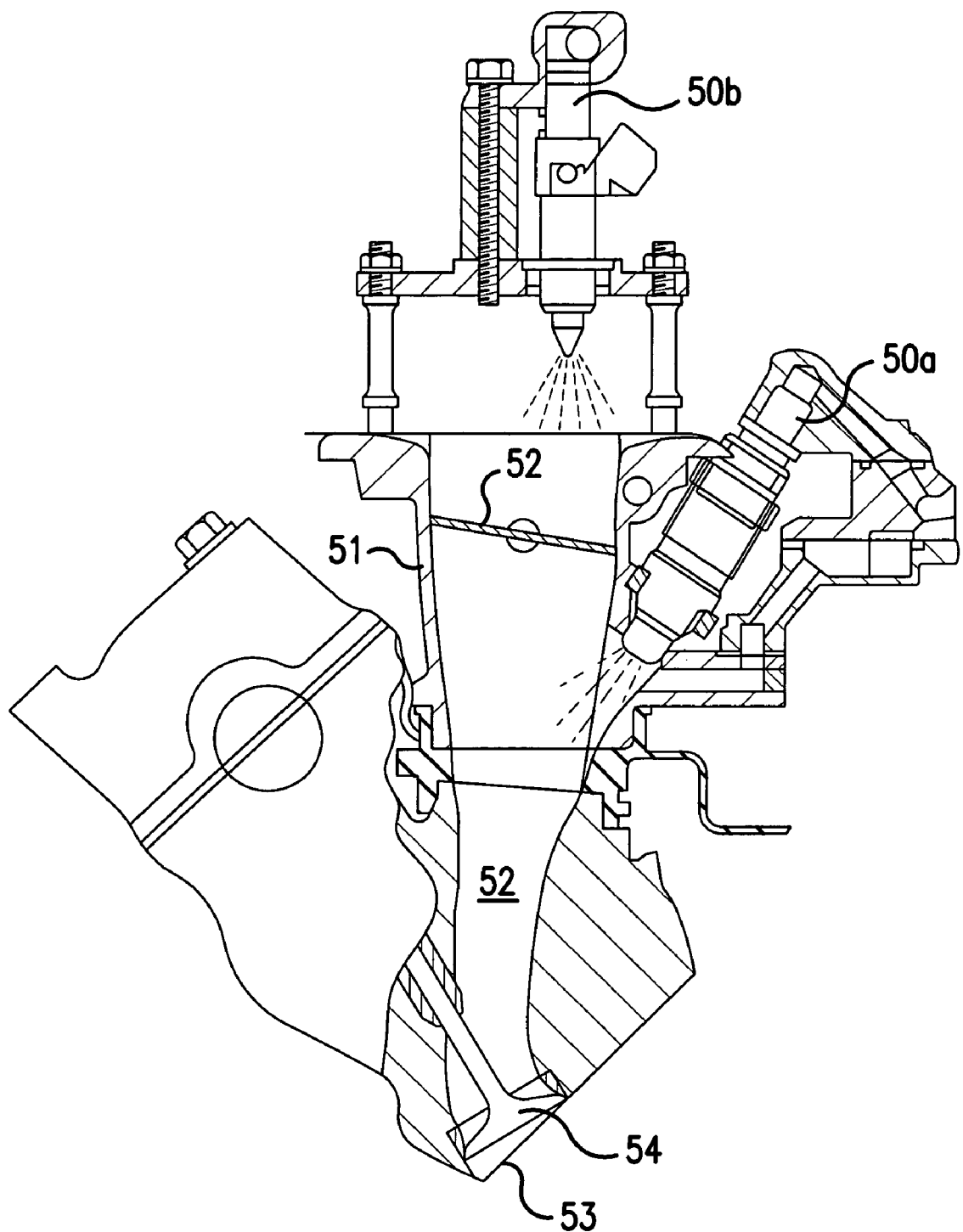
FIG. 10 is a cross-sectional view showing a conventional technique in which two fuel injection valves have been arranged.

FIG. 9 is a view showing an example of the lean rendering duration period table, and a time period Nlean during which rendering the downstream injection lean is continued has been registered in advance as a function of the rate of change during the injection cut $\Delta\theta$THcut. In a step S61, the lean rendering frequency counter Ncount is compared with the lean rendering duration period Nlean, and since Ncount. Nlean at the beginning, the handling concerned will be terminated as it is.

Reverting to FIG. 4, in the step S15, the injection rate Rupper of the upstream fuel injection valve 8a will be corrected on the basis of the following expression (1).

$$R\text{upper} = R\text{upper} \times KTWRU \times KTARU \quad (1)$$

In a step S16, the upstream injection cut flag Fcut is referred to, and if this has been set, in a step S18, "0" will be set to the injection quantity Qupper. If the flag Fcut has not been set, in a step S17, the upstream injection quantity determination unit 1051 will calculate the injection quantity Qupper of the upstream injection valve 8a on the basis of the following expression (2).

$$Q\text{upper} = Q\text{total} \times R\text{upper} \quad (2)$$

In a step S19, the downstream injection quantity determination unit 1052 will calculate the injection quantity Qlower of the downstream injection valve 8b on the basis of the following expression (3).

$$Q\text{lower} = (Q\text{total} - Q\text{upper}) \times K\text{lean} \quad (3)$$

In this case, since the lean rendering correction factor Klean is a smaller factor than "1.0" as shown in FIG. 7, the injection quantity Qlower of the downstream injection valve 8b is to be reduced to a level lower than when injection from the upstream valve is stopped.

Reverting to FIG. 6, since it is judged in the step S55 that the lean rendering handling has been twice or more times in the next period, the sequence will proceed to a step S60 to increment the lean rendering frequency counter Ncount by "1".

Thereafter, in a step S61, since each handling described above will be repeated before it is judged that Ncount>Nlean, the downstream injection will continue to be rendered lean in response to the lean rendering correction factor Klean.

Thereafter, a relationship of Ncount>Nlean is reached at a time t2 of FIG. 7 and this is detected in the step S61, the sequence will proceed to a step S62. In the step S62, an added value (Klean+$\Delta$Klnrtn) of the lean rendering correction factor Klean and a return opening $\Delta$Klnrtn will be renewed and registered as a new lean rendering correction factor Klean. In other words, as shown in FIG. 7, at a time t2 and thereafter, the lean rendering correction factor Klean gradually increases the return opening $\Delta$Klnrtn at a time. Accordingly, the injection quantity Qlower of the downstream injection valve 8b to be calculated in a step S19 of FIG. 4 also gradually increases.

In a step S63, it is judged whether or not the lean rendering correction factor Klean after renewal exceeds "1.0" of the upper limit value, and if it is not exceeded, the lean rendering correction factor Klean concerned will be adopted as it is. Thereafter, at a time t3 of FIG. 7, the lean rendering correction factor Klean reaches "1.0" and when this is detected in the step S63, the sequence will proceed to a step S64, where various correction factors will be initialized and the lean rendering correction factor Klean will be regulated at an upper limit value of "1.0". Accordingly, the injection quantity Qlower of the downstream injection valve 8b to be calculated in a step S19 of the FIG. 4 also returns to the injection quantity to the level prior to when the injection from the upstream valve was stopped.

According to the present invention, the following advantages will be achieved.

(1) Since when the throttle valve is abruptly enclosed, the fuel injection from the upstream injection valve is stopped immediately, and fuel adhering to and remaining at the throttle valve is restricted to a minimum.

(2) Since when the fuel injection from the upstream injection valve is stopped in response to the throttle valve being abruptly enclosed, the injection quantity from the downstream fuel injection valve is reduced, the total supply quantity of the fuel can be maintained at an appropriate value, even if a small amount of fuel which may have adhered to and have remained at the throttle valve is supplied into the combustion chamber when the throttle valve is opened again thereafter.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A fuel injection system for an internal combustion engine comprising:

an intake pipe equipped with a throttle valve;

an upstream fuel injection valve provided upstream from said throttle valve;

a downstream fuel injection valve provided downstream from said throttle valve;

means for determining each fuel injection quantity of fuel injection valves on the upstream and downstream sides on the basis of a plurality of parameters including a throttle opening $\theta$TH and engine speed NE;

means for detecting a rate of change of said throttle opening in an injection-valve closing direction; and means for stopping fuel injection of said upstream fuel injection valve when said rate of change is larger than a reference rate of change.

2. The fuel injection system for an internal combustion engine according to claim 1, further comprising means for reducing an injection quantity of said downstream fuel injection valve only during a predetermined time period when injection of said upstream fuel injection valve is stopped.

3. The fuel injection system for an internal combustion engine according to claim 1, the means for determining the fuel injection quantity of each of the fuel injection valves comprising:

an upstream injection quantity determination unit for seeking a basic injection quantity of the upstream injection valve based on an injection rate and a total injection quantity, and multiplies the basic injection quantity by one or more correction factors including an intake temperature correction factor and a cooling water correction factor to determine the injection quantity of the upstream injection valve; and a downstream injection quantity determination unit for determining an injection quantity of the downstream injection valve based on the upstream injection quantity and the total injection quantity.

4. The fuel injection system for an internal combustion engine according to claim 1, wherein the means for stopping fuel injection of said upstream fuel injection valve stops an operation of the upstream injection valve in each of four cylinders so that fuel does not adhere in high amounts to the throttle valves associated with each of the cylinders when the throttle valves are abruptly closed.

5. The fuel injection system for an internal combustion engine according to claim 2, wherein after the predetermined period of time has past, the injection quantity of the downstream fuel injection valve increases to an injection quantity level equal to the injection quantity of the downstream fuel injection valve prior to stopping of the injection from the upstream fuel injection valve.

6. The fuel injection system for an internal combustion engine according to claim 5, wherein the injection quantity of the downstream injection valve gradually increases in a step-wise manner based on a lean rendering correction factor after the predetermined period of time has past.

7. A method for injecting fuel in an internal combustion engine with a fuel injection system, the fuel injection system having an intake pipe equipped with a throttle valve; an upstream fuel injection valve provided upstream from said throttle valve; a downstream fuel injection valve provided downstream from said throttle valve, the method comprising the steps of:

determining each fuel injection quantity for each of the fuel injection valves on the upstream and downstream sides on the basis of a plurality of parameters including a throttle opening θTH and engine speed NE;

detecting a rate of change of said throttle openings in an injection-valve closing direction; and stopping fuel injection of said upstream fuel injection valve when said rate of change is larger than a reference rate of change.

8. The method for injecting fuel in an internal combustion engine according to claim 7, further comprising the step of reducing an injection quantity of said downstream fuel injection valve only during a predetermined time period when injection of said upstream fuel injection valve is stopped.

9. The method for injecting fuel in an internal combustion engine according to claim 7, the step of determining the fuel injection quantity of each of the fuel injection valves further comprises the steps of:

seeking a basic injection quantity of the upstream injection valve based on an injection rate and a total injection quantity, and multiplying the basic injection quantity by one or more correction factors including an intake temperature correction factor and a cooling water correction factor to determine the injection quantity of the upstream injection valve; and determining an injection quantity of the downstream injection valve based on the upstream injection quantity and the total injection quantity.

10. The method of injecting fuel in an internal combustion engine according to claim 7, wherein stopping fuel injection of said upstream fuel injection valve includes stopping an operation of the upstream injection valve in each of four cylinders so that fuel does not adhere in high amounts to the throttle valves associated with each of the cylinders when the throttle valves are closed abruptly.

11. The method of injecting fuel in an internal combustion engine according to claim 8, after the predetermined period of time has past, further comprising the step of increasing the injection quantity of the downstream fuel injection valve to an injection quantity equal to the injection quantity of the downstream fuel injection valve prior to stopping of the injection from the upstream fuel injection valve.

12. The method of injecting fuel in an internal combustion engine according to claim 11, wherein gradually increasing the injection quantity of the downstream injection valve in a step-wise manner based on a lean rendering correction factor, after the predetermined period of time has past.

* * * * *